(12) United States Patent
Carter et al.

(10) Patent No.: US 6,908,140 B1
(45) Date of Patent: Jun. 21, 2005

(54) DOOR MODULE CABLE HOLDER

(75) Inventors: Eluid David Carter, Southfield, MI (US); Santhosh Karumuri, Inkster, MI (US); Thomas Risner, Highland, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/785,363

(22) Filed: Feb. 24, 2004

(51) Int. Cl.[7] ................................................. B60J 5/00
(52) U.S. Cl. .................................. 296/146.1; 296/146.2
(58) Field of Search .............................. 296/208, 146.2, 296/146.1

(56) References Cited

U.S. PATENT DOCUMENTS

| | | | | |
|---|---|---|---|---|
| 5,535,553 A | * | 7/1996 | Staser et al. .................. | 49/502 |
| 5,924,245 A | * | 7/1999 | Manuel et al. ................. | 49/352 |
| 5,937,584 A | * | 8/1999 | Salmonowicz et al. ........ | 49/502 |
| 6,139,088 A | * | 10/2000 | Okamoto et al. ......... | 296/146.6 |
| 2002/0005015 A1 | * | 1/2002 | Spurr .......................... | 49/502 |
| 2002/0007598 A1 | * | 1/2002 | Nishikawa et al. ........... | 49/502 |
| 2004/0125545 A1 | * | 7/2004 | Kobayashi et al. ......... | 361/600 |

* cited by examiner

Primary Examiner—Jason Morrow
(74) Attorney, Agent, or Firm—Carlson, Gaskey & Olds

(57) ABSTRACT

A door module with a cable holder that includes a latch bracket attached to a door panel and a door latch, and a handle bracket attached to the door latch and a handle support. The handle support connects to an external door handle and personal identification keypad through a door shell. The keypad utilizes a cable for operation. The cable runs through the door module that includes a cable holder that routes and retains the cable.

23 Claims, 4 Drawing Sheets

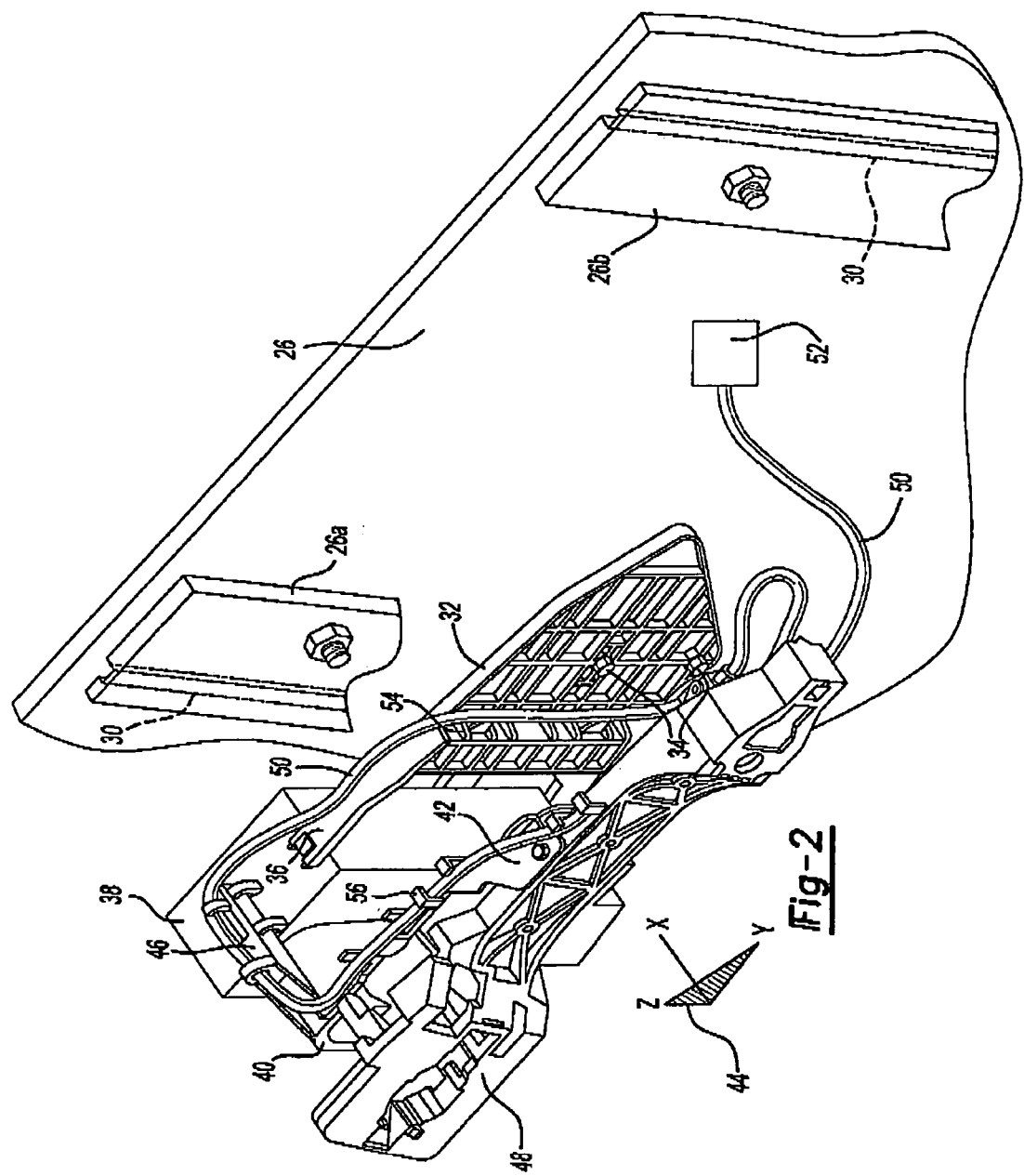

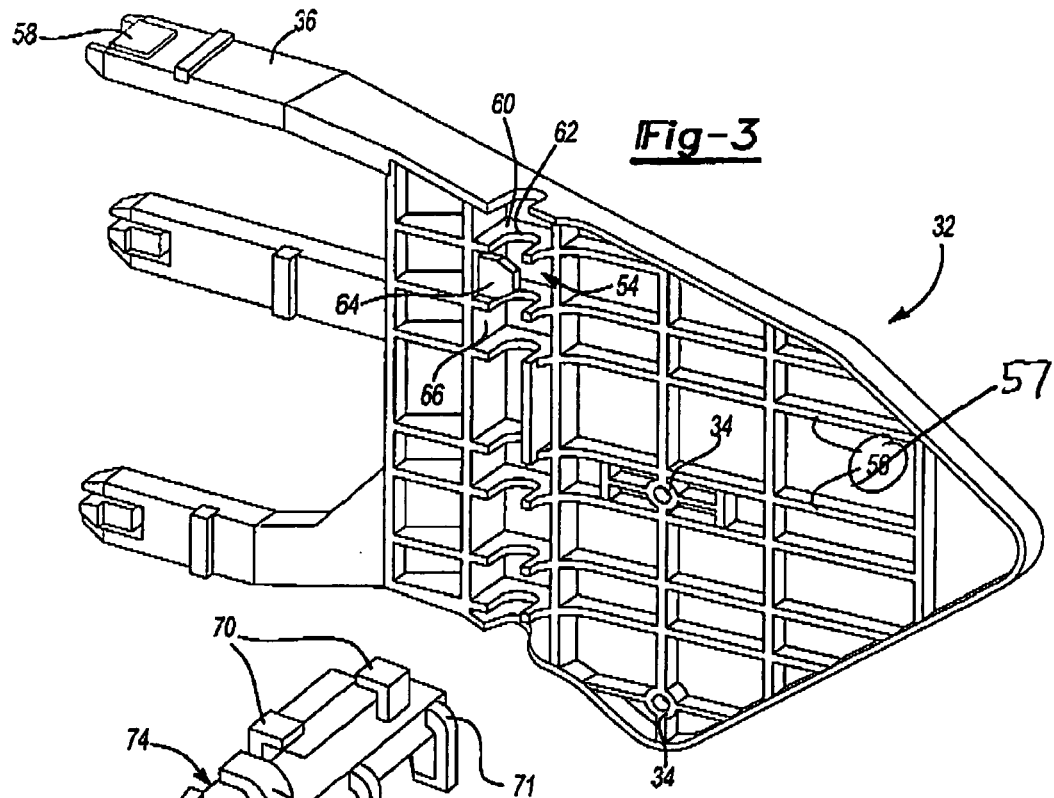
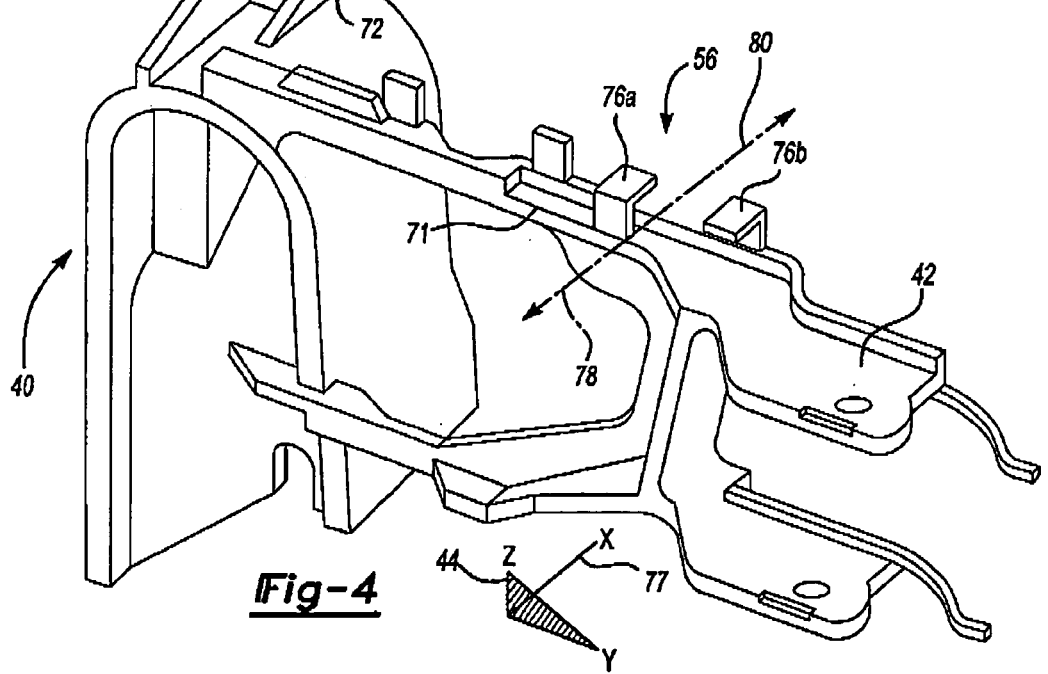

DOOR MODULE CABLE HOLDER

BACKGROUND OF THE INVENTION

This invention relates to vehicle door assemblies and, more particularly, to a vehicle door module with a cable holder for routing and retaining a cable.

A vehicle door typically includes an outer shell that houses various door components. The door components include a door panel that is received into the outer shell. The door panel operates as an attachment for various door components such as window guides, a safety system, a sound system, and a door locking mechanism. The door panel, attached components, and accompanying system of cables and wires to operate the various components are typically preassembled and then installed into the outer shell as a module.

In particular, the cables that serve the various components may be difficult to route and retain within the door module. For one, the door components hinder the routing of the cables and any loose or unsecured cables may cause noise by vibrating against the components when the vehicle is in motion. Also, loose or unsecured cables may make assembly of the door module into the door outer shell more difficult by snaring nearby objects.

Presently, separately mounted clips and/or twist ties route and retain component cables. Such conventional fasteners may be difficult to assemble and typically increase labor and component expense.

Accordingly, it is desirable to provide a door module that includes a bracket assembly with a cable holder to route and retain a cable within the door module.

SUMMARY OF THE INVENTION

The door module according to the present invention includes a latch bracket attached to a door panel. The latch bracket is attached to a door latch which is attached to a handle bracket. The handle bracket attaches to a handle support that connects to an external door handle and personal identification ("PIC") keypad through a door shell. The PIC keypad utilizes a PIC cable for operation. The PIC cable runs along the door module, which includes a latch bracket cable holder integrated into the structural ribs of the latch bracket and a handle bracket cable holder integrated into the handle bracket to route and retain the PIC cable.

In another latch bracket cable holder, structural ribs having channels and a protruding tab route and retain the PIC cable. In another handle bracket cable holder, a hook located on a periphery of the handle bracket routes the PIC cable. In another handle bracket cable holder, oppositely faced hooks located on a periphery of the handle bracket route and retain the PIC cable.

Another handle bracket cable holder comprises a clamshell clip. The clamshell clip includes a relatively static portion and a movable mating portion that opens and closes. Once the moveable mating portion is in a closed position, the clamshell clip routes and retains the PIC cable.

The door module according to the present invention provides a cable holder to route and retain a cable within a door module.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 2 shows an angled perspective view of a door module;

FIG. 3 shows an angled perspective view of a latch bracket cable holder;

FIG. 4 shows an angled perspective view of a handle bracket cable holder with hooks;

DETAILED DESCRIPTION OF THE PREFERRED EMBODIMENT

Figure 1A:
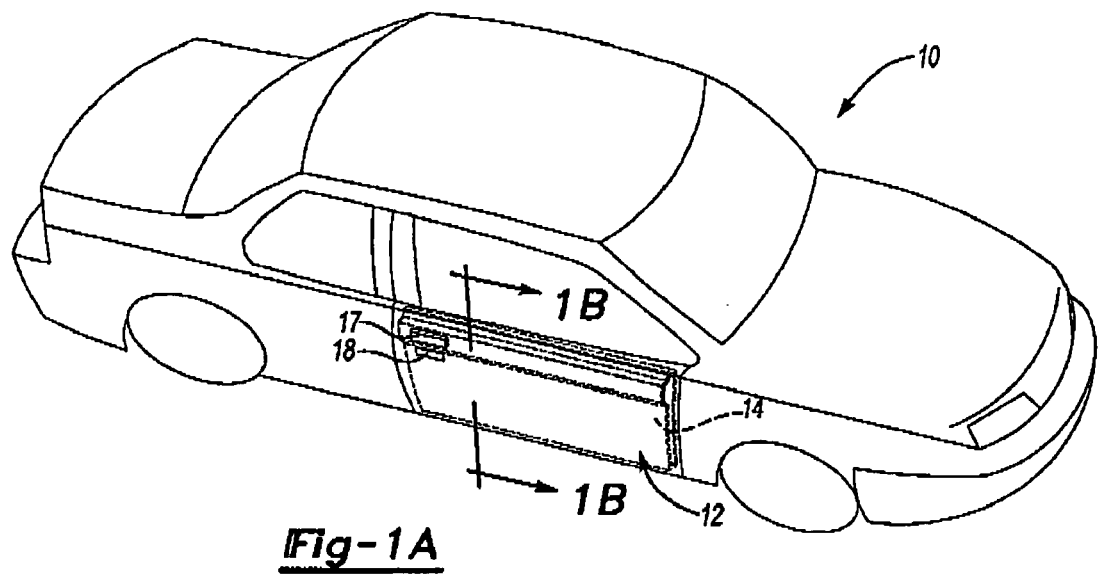
FIG. 1A shows general perspective view of a vehicle having a door and a door module.
Figure 1B:
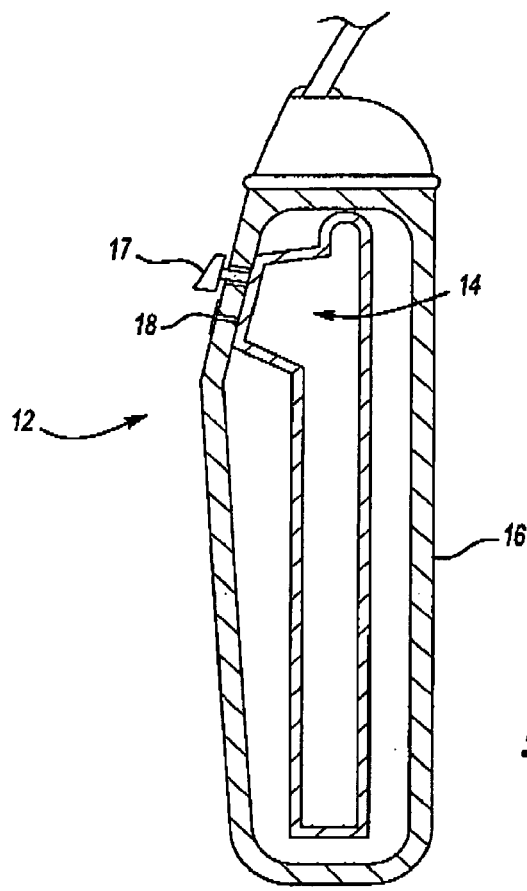
FIG. 1B shows a cross sectional view of a door module received in a door shell.

FIG. 1A illustrates a vehicle 10 having a door 12. The door 12 includes a door module 14. As shown in FIG. 1B, a door shell 16 of the door 12 receives the door module 14 therein. The door module 14 connects to an external handle 17 and personal identification code ("PIC") keypad 18 of the door 12. The PIC keypad 18 allows a vehicle operator to unlock the door 14 using a code.

Referring to FIG. 2, the door module 14 includes a door panel 26 that accommodates window guides 26a and 26b, each of which define parallel axes 30 along which a window (not shown) moves. A latch bracket 32 is attached to the door panel 26 and extends generally perpendicular to the axis 30. The latch bracket 32 includes attachment bosses 34 for attachment to the door panel 26 through fasteners on the like. An extended support arm 36 attaches to a door latch 38. The door latch 38 is attached to a handle bracket 40 by way of a support arm 42 that extends in the X-Z plane 44. A latch support arm 46 of the handle bracket 40 transversely extends from the X-Z plane 44 and attaches to a handle support 48. The handle support 48 connects to the external handle 17 and PIC keypad 18 through the door shell 16 as referred to in FIG. 1B.

The PIC keypad 18 (FIG. 1B) utilizes a PIC cable 50 for operation. The PIC cable 50 routes from the PIC keypad 18 through the door shell 16, the handle support 48, the handle bracket 40, and the latch bracket 32 to a controller unit 52 in the vehicle 10. The latch bracket 32 and handle bracket 40 include a latch bracket cable holder 54 and handle bracket cable holder 56, respectively, for routing and retaining the PIC cable 50. It should be understood that although a particular cable route is disclosed in the illustrated embodiment and that other routes will also benefit.

Referring to FIG. 3, the latch bracket 32 includes structural ribs 56 that reinforce the latch bracket 32. The structural ribs 57 are generally in a perpendicularly intersecting arrangement. The latch bracket 32 includes an extended support arm 36 that attaches by a snap-fit portion 58 to the door latch (FIG. 2). The structural rib 60 includes a generally U-shaped channel 62 that receives the PIC cable 50. A tab 64 protrudes from the structural rib 66 over the channel 62 to retain the PIC cable 50 in the channel 62. The tab 64 is preferably flexible to deflect and allow insertion of the PIC cable 50 into the channel 62.

Referring to FIG. 4, the handle bracket cable holder 56 includes hooks 70 located on a periphery 71 of the handle bracket 40. The arcuate shaped hooks 70 have a closed side 72 and an open side 74 to receive the PIC cable 50. The hook 70 extends around a portion of the PIC cable 50 to route and retain the PIC cable 50.

An arcuate shaped hook portion 76*a* and an arcuate shaped hook portion 76*b* extend in the X-Z plane 77. Hook portion 76*a* and 76*b* are oppositely faced. That is, the directions that their open sides face are at an angle of about 180 degrees. When the PIC cable 50 is received into the hook portion 76*a* and hook portion 76*b*, the hook portion 76*a* prevents movement of the PIC cable 50 in the direction 78 while the hook portion 76*b* prevents movement in the opposite direction 80 to route and retain the PIC cable 50.

Figure 5A:
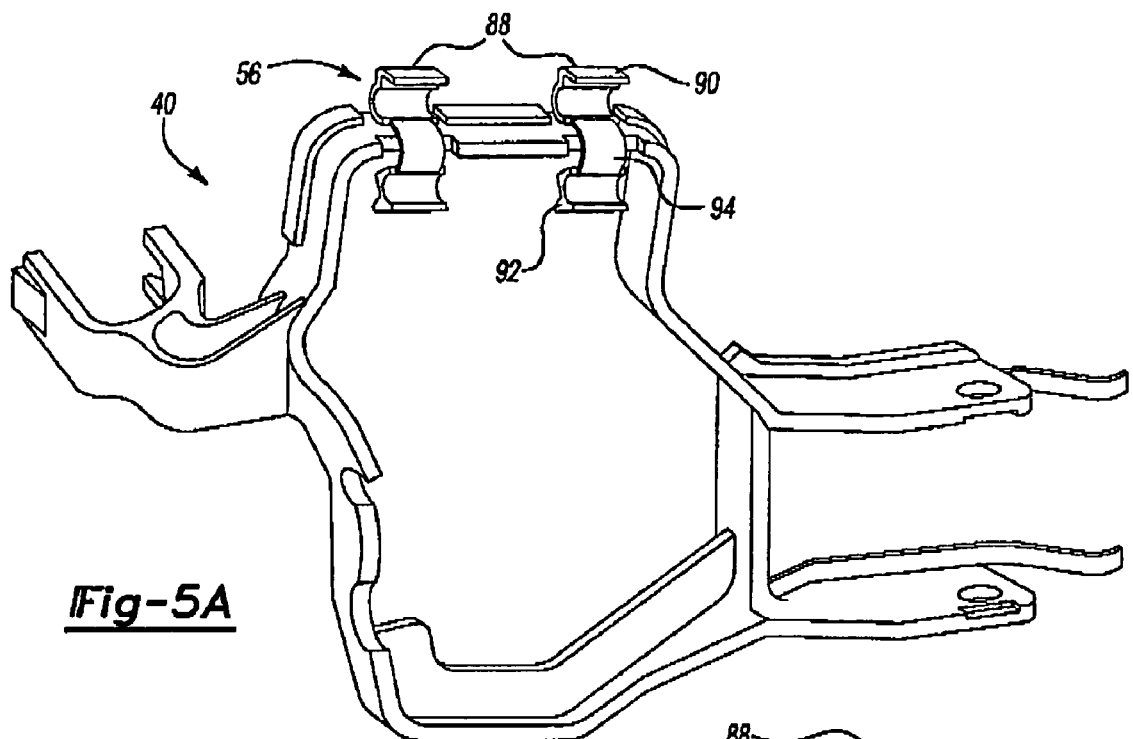
FIG. 5A shows an angled perspective view of a handle bracket cable holder with a clamshell clip in an open position.
Figure 5B:
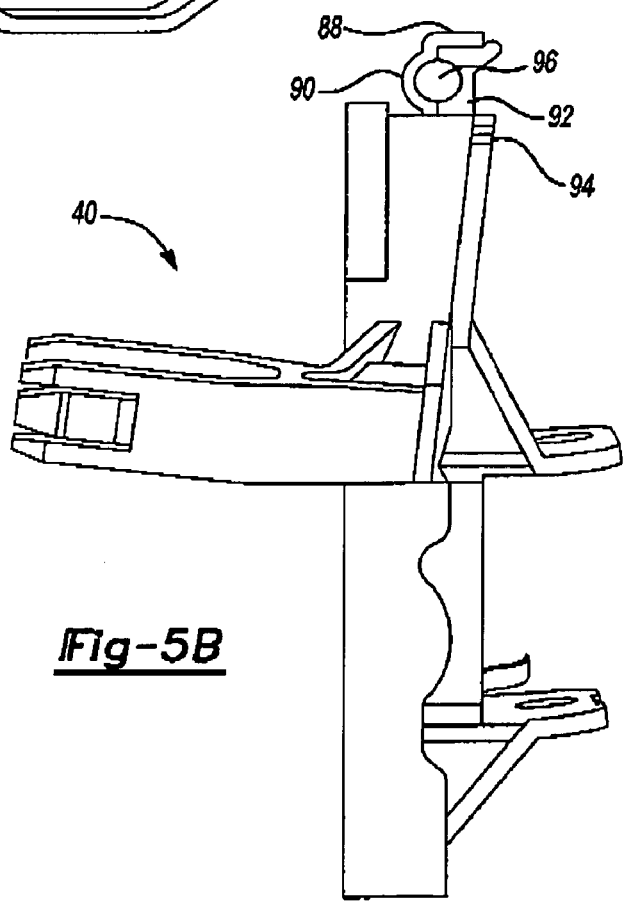
FIG. 5B shows a cross sectional view of the handle bracket cable holder with the clamshell clip in a closed position.

Referring to FIG. 5A, another handle bracket cable holder 56 includes a clamshell clip 88. The clamshell clip 88 includes a relatively static portion 90 and a movable mating portion 92 that has an open and a closed position. The moveable mating portion 92 includes a thin flexible hinge strip 94 such that the moveable mating portion 92 is moveable from the open position (FIG. 5A) to the closed position (FIG. 5B). When the moveable mating portion 92 is in a closed position, the clamshell clip 88 routes and retains the PIC cable 50 in the area 96 between the static portion 90 and a movable mating portion 92.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A vehicle door module comprising:
    a latch bracket attached to a door panel, said latch bracket comprising a latch bracket cable holder;
    a door latch attached to said latch bracket;
    a handle bracket attached to said door latch, said handle bracket comprising a handle bracket cable holder; and
    a handle support attached to said handle bracket for attachment of an external handle.

2. The vehicle door module as recited in claim 1, wherein said latch bracket comprises structural ribs and an extended support arm for attachment and support of said door latch.

3. The vehicle door module as recited in claim 1, wherein said handle bracket comprises a handle support arm that extends in a plane of the handle bracket and a latch support arm that transversely extends from said plane.

4. The vehicle door module as recited in claim 1, wherein said latch bracket cable holder comprises a channel through a structural rib.

5. The vehicle door module as recited in claim 4, wherein said latch bracket cable holder comprises a tab that protrudes from a transverse structural rib over said channel.

6. The vehicle door module as recited in claim 1, wherein said handle bracket cable holder comprises a clamshell clip located on a periphery of said handle bracket.

7. The vehicle door module as recited in claim 6, wherein said clamshell clip comprises a relatively static portion and a movable mating portion that has an opened and a closed position.

8. The vehicle door module as recited in claim 1, wherein said handle bracket cable holder comprises a hook located on a periphery of said handle bracket.

9. A vehicle door module comprising:
    a door panel comprising a window guide;
    a latch bracket attached to said door panel, said latch bracket comprising a latch bracket cable holder that includes a cable-securing feature; and
    a door latch attached to said latch bracket.

10. The vehicle door module as recited in claim 9, wherein said latch bracket comprises a structural rib and an extended support arm for attachment and support of said door latch.

11. The vehicle door module as recited in claim 9, wherein said cable-securing feature comprises a channel through a structural rib.

12. The vehicle door module as recited in claim 11, wherein said cable-securing feature comprises a tab that protrudes from a transverse structural rib over said channel.

13. A vehicle door module comprising:
    a door latch;
    a handle bracket attached to said door latch, said handle bracket comprising a handle bracket cable holder; and
    a handle support attached to said handle bracket for attachment of an external handle.

14. The vehicle door module as recited in claim 13, wherein said handle bracket comprises a latch support arm that extends in a plane of the handle bracket and a handle support arm that transversely extends from said plane.

15. The vehicle door module as recited in claim 13, wherein said handle bracket cable holder comprises a clamshell clip located on a periphery of said handle bracket.

16. The vehicle door module as recited in claim 15, wherein said handle bracket cable holder comprises a relatively static portion and a movable mating portion that has an opened and a closed position.

17. The vehicle door module as recited in claim 13, wherein said handle bracket cable holder comprises a hook located on a periphery of said handle bracket.

18. The vehicle door module comprising:
    a door panel comprising a window guide that defines an axis;
    a latch bracket attached to said door panel, said latch bracket comprising a structural rib and an extended support arm for attachment and support of said door latch, and a latch bracket cable holder; and
    a door latch attached to said latch bracket.

19. The vehicle door module as recited in claim 18, wherein said latch bracket cable holder comprises a channel through said structural rib.

20. The vehicle door module as recited in claim 19, wherein said latch bracket cable holder comprises a tab that protrudes from a transverse structural rib over said channel.

21. The vehicle door module as recited in claim 9, wherein said cable-securing feature includes walls that partially surround a circumference of a cable when the cable is received in the cable-securing feature.

22. The vehicle door module as recited in claim 21, wherein at least one of said walls includes a curved surface and another of said walls includes an essentially flat surface.

23. The vehicle door module as recited in claim 21, wherein said cable-securing feature includes an axis that corresponds to a longitudinal axis of the cable, and said cable-securing feature receives the cable in a radial direction relative to said axis.

* * * * *